United States Patent
Gresham

[15] 3,686,283
[45] Aug. 22, 1972

[54] FLUORINATED THIOETHER-ACRYLIC ESTERS AND POLYMERS THEREOF

[72] Inventor: John Thomas Gresham, Skillman, N.J.

[73] Assignee: FMC Corporation, New York, N.Y.

[22] Filed: Oct. 13, 1970

[21] Appl. No.: 80,472

[52] U.S. Cl..............260/486 H, 8/17, 117/135.5, 117/143 A, 117/161 UC, 117/161 UZ, 260/79.7, 260/555 S, 260/583 EE, 260/609 B, 260/609 F, 260/900
[51] Int. Cl..............................................C07c 69/54
[58] Field of Search....................260/486 H

[56] References Cited

UNITED STATES PATENTS 3,239,557  3/1966  Fasick ......................260/486

FOREIGN PATENTS OR APPLICATIONS 662,656  12/1951  Great Britain.............260/486

*Primary Examiner*—Lorraine A. Weinberger
*Assistant Examiner*—Paul J. Killos
*Attorney*—Robert D. Jackson, Eugene G. Seems and Pauline Newman

[57] ABSTRACT

Fluorinated thioether-acrylic esters of the formula

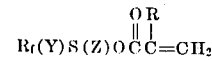

wherein R is hydrogen or methyl, $R_f$ is a perfluoroalkyl group of four to 16 carbon atoms and each of Y and Z is a saturated, aliphatic divalent group in which Y contains one to 11 carbon atoms and Z contains two to 11 carbon atoms. Also disclosed are polymers of such thioether esters for use in rendering textiles oil and water repellent.

10 Claims, No Drawings

FLUORINATED THIOETHER-ACRYLIC ESTERS AND POLYMERS THEREOF

BACKGROUND OF THE INVENTION

A. Field of the Invention

This invention relates to fluorinated acrylic esters. It is particularly concerned with certain fluorinated thioether acrylic esters and polymers thereof useful in the treatment of textiles and other fibrous and porous materials for rendering them oil and water repellent.

B. Description of the Prior Art

The application of fiber-substantive materials to cloth for the purpose of increasing its water repellency, is well known in the modern textile field. Especially promising in this connection are certain organic fluorine derivatives which impart both water and oil repellency to fabrics and other fibrous substrates. As a consequence, considerable work and effort is being channeled into the synthesis of organic fluorine compounds with a view to uncovering improved members of these entities.

Among the new structures engendered by such investigations is a class of fluorinated polyacrylates, the monomer units of which consist of a perfluoroalkyl group attached either directly or through an intervening segment to an acrylate function. These new entities exhibit many features required of oil and water repellents i.e. good stability and durability to wear, washing or dry cleaning while not adversely affecting the hand of the fabric. However, it is generally felt that the full potential of fluorinated polyacrylates have yet to be realized and that more efficient derivatives of the class are obtainable.

SUMMARY OF THE INVENTION

I have now discovered that excellent oil and water repellent properties in articles can be achieved by treating the articles with a polymer composition containing at least one novel polymer component formed from the polymerization of a fluorinated thioether-acrylic ester of the formula:

$$R_f(Y)S(Z)OCC=CH_2$$
$$\overset{O}{\underset{}{\|}}\overset{R}{\underset{}{|}}$$

wherein R is hydrogen or methyl, $R_f$ is a perfluoroalkyl group of four to 16 carbon atoms and each of Y and Z is a saturated, aliphatic divalent group in which Y contains one to 11 carbon atoms and Z contains two to 11 carbon atoms and the provision of these novel materials and their use as oil and water repellents constitutes the principal object and purpose of the invention. Other objects and purposes will become manifest subsequently.

DESCRIPTION OF THE INVENTION AND THE PREFERRED EMBODIMENTS

The thioether-acrylic esters of the invention can be produced by various known ester syntheses such as, for instance, direct esterification of the acrylic or methacrylic acid with the requisite thioether-alcohol. Other suitable ester syntheses include transesterification and reaction of the alcohol with an acid chloride. The over-all esterification scheme aforesaid is depicted in the following generalized equation:

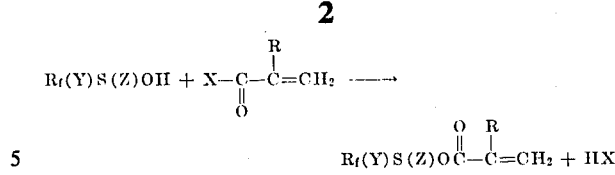

wherein $R_f$, R, Y and Z have previously assigned values while X is —OH, lower alkoxyl, such as —OCH₃ or —OC₂H₅, or halogen, e.g. —Cl.

In most instances, we have found it convenient to prepare the thioether-esters herein by direct esterification between an acrylic acid and the requisite thioether-alcohol. Equally good results are attainable using the acid chloride of the acrylic acid component. When the thioether-alcohol is a perfluoroalkylmercaptoethanol i.e.

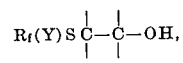

direct esterification in the presence of the usual acid catalyst gives, in addition to the desired ester, a large amount of ether formed by dehydration of the alcohol. Accordingly, direct esterification is not a recommended method when using this type of thioether-alcohol. Transesterification with non-acidic catalysts particularly alkyl titanates and stannates works well without ether formation. Further details on ester syntheses can be found in any of the numerous and well known texts on organic chemistry.

The thioether-alcohol intermediates herein are known chemical entities, the description and preparation of which are set forth in the technical literature and in this connection reference is made to German Offenlegungschrift P 1,918,079 to J. R. Geigy, Inc. This document identified such alcohols as having the formula $HO(CH_2)_nS(CH_2)_nR_f$ and that they are formed by the reduction of the precursor esters which in turn have the formula $CH_3OCO(CH_2)_nS(CH_2)_nR_f$ and are described in U.S. Pat. No. 3,172,910.

The thioether-alcohols also can be prepared by first forming a polyfluoroalkyl mercaptan by reacting a polyfluoroalkyl iodide with thiourea and hydrolyzing the resulting isothiouronium salt. The polyfluoroalkyl mercaptan is then converted to the thioether-alcohol by reaction with one of the following (1) a haloalkanol, (2) an unsaturated alcohol or (3) an alkylene oxide of two to 11 carbon atoms.

The reactions aforesaid are typified in equation form below wherein, for the sake of illustration, Z is alkylene.

Perfluoroalkyl mercaptans

A. $R_f(Y)I + S=C(NH_2)_2 \longrightarrow$

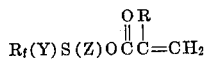

$I^{\ominus} + NaOH \longrightarrow$ $R_f(Y)SH + O=C(NH_2)_2 + NaI$

Thioether-alcohols

B. (1) $R_f(Y)SM + Cl-CH_2-(CH_2)_{1-10}OH \longrightarrow$
$R_f(Y)-S-CH_2(CH_2)_{1-10}OH + MCl$ M=Na,K (2) $R_f(Y)-SH + CH_2=CH(CH_2)_{1-9}OH \xrightarrow[\text{initiator}]{\text{free radical}}$
$R_f(Y)-S-CH_2CH_2(CH_2)_{1-9}OH$

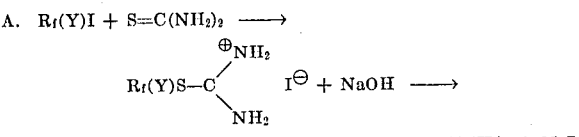

Instead of starting with a fluorinated mercaptan as shown in equations B(1), B(2), and B(3), the $R_f$ moiety may be introduced in accordance with the following schemes wherein, for the sake of illustration, Y is alkylene.

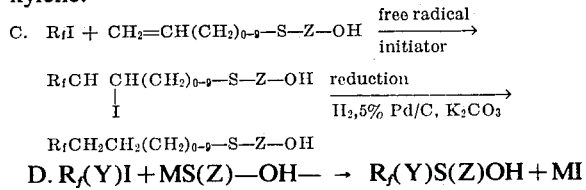

D. $R_f(Y)I + MS(Z)—OH— \rightarrow R_f(Y)S(Z)OH + MI$ wherein M is an alkali metal.

The fluorinated acrylic esters herein are valuable monomers useful in preparing polymer compositions which impart excellent oil and water repellency to textiles and other substrates such as paper, leather, etc. In formulating the polymeric compositions aforesaid, the polymer may be derived solely from the fluorinated acrylic ester of the invention and identified by the recurring unit

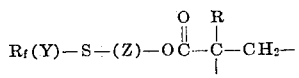

wherein $R_f$, R, Y and Z have the previously assigned values. It is to be understood that Y, Z and $R_f$ chain length may be the same or different in the various recurring units making up the polymer chain. Thus, the polymer can be a homopolymer of a fluorinated acrylic ester monomer, as, for example:

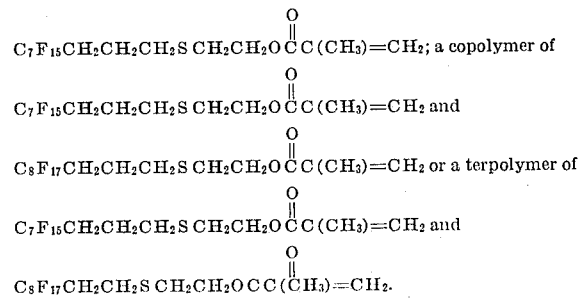

From the standpoint of economy and in some instances for the sake of achieving superior performance, the polymeric compositions are preferably formulated wherein the polymer is derived only in part from the fluorinated acrylic esters herein. Thus, the polymer can be a copolymer of one or more of the fluorinated acrylic esters herein with a non-fluorine containing vinyl compound. Or the polymer can be a mixture of a non-fluorinated polymer or polymers and a polymer or polymers formed from one or more of the fluorinated acrylic esters of the invention or a copolymer or copolymers of one or more of the fluorinated acrylic esters and a non-fluorine containing vinyl compound.

The homopolymers and copolymers aforesaid can be produced by methods known to the art, such as bulk polymerization, solution polymerization and emulsion polymerization, using catalysts such as benzoyl peroxide, or other free radical polymerization initiators. Solvents illustrative of those which can be used as media in the solution polymerization are trichlorofluoromethane; 1,2,2-trichloroethane; benzene, benzotrifluoride; xylene hexafluoride; 1,1-dichloroethane; the lower saturated aliphatic esters such as butyl acetate and the like.

Suitable co-monomers include generally the ethylenically unsaturated monomers, including acrylates and methacrylates, vinyl esters of aliphatic acids, styrene and alkylstyrenes, vinyl halides, vinylidene halides, allyl esters, vinyl alkyl ketones, acrylamides, butadienes, and the like. Specific examples of the aforelisted general compounds are the methyl, ethyl, propyl, butyl, isoamyl, 2-ethylhexyl, octyl, octadecyl, undecyl, cetyl and N, N-diethylaminoethyl esters of acrylic acid and methacrylic acid, the vinyl esters of acetic, propionic, caprylic, lauric, and stearic acids; styrene, 2-methylstyrene, p-methylstyrene, vinyl fluoride, vinyl chloride and vinyl bromide, vinylidene chloride and vinylidene fluoride, allyl esters of heptanoic, caprylic, and caproic acids, vinyl ethyl ketone, vinyl methyl ketone, 1,3-butadiene, 2-chloro-1,3-butadiene, 2,3-dichloro-1,3-butadiene, N-methylol acrylamide and N-methylol methacrylamide, glycidyl acrylate and glycidyl methacrylate, and others. The specific reason for adding or using N-methylol acrylamide and/or methacrylamide in the co-polymerization reaction is that these compounds improve the durability of the resulting polymer, after it becomes associated with the cellulosic substrate or with other fibers containing active hydrogens. Suitable catalysts for initiating polymerization whether co- or homopolymerization, include 2,2'-azodiisobutyramidine dihydrochloride, 2,2'-azodiisobutyronitrile, 4,4'-azobis-(4-cyanovaleric acid), sodium peroxide, barium peroxide, hydrogen peroxide, ammonium persulfate, potassium persulfate, as well as various organic peroxides. The concentration of the initiator is commonly between about 0.1 percent and about 2 percent of the weight of the monomers. Generally the polymerization is carried out by raising the temperature to about 40° to 70° C.

Typical of the substrates which are amenable to treatment with the compositions produced according to the present invention are films, fibers, yarns, fabrics, and articles made from filaments, fibers, or yarns derived from natural, modified natural, or synthetic polymeric materials or from blends of these. Specific examples are cotton, silk, regenerated cellulose, nylon, fiber-forming linear polyesters, fiber-forming polyacrylonitrile, cellulose nitrate, cellulose acetate, ethyl cellulose, paper, fiber glass and the like. Dyed and undyed cotton sateen, poplin, broadcloth, jean cloth, gabardine and the like are especially adaptable for treatment with the compositions of this invention to provide products having a high repellency to oil and water and being relatively unaffected by the action of heat, air and light. Materials rendered oil and water repellent retain a portion of the original repellent when laundered and dry cleaned.

The compositions herein are applied to the desired substrate preferably as an aqueous dispersion, by brushing, dipping, spraying, padding, roll-coating or by any combination of these methods. For example, the prepared concentrated dispersion of polymer composition may be used as a pad bath by diluting it with water or other suitable media to a solids content of 0.1 to 10 percent by weight of the bath. Thus, a sample of textile or paper is padded in an aqueous bath of the type aforesaid and then freed of excess liquid, usually by squeeze rolls to a dry pickup (weight of the dry polymer on the substrate) between about 0.1 to 10 percent by weight of the fiber. The treated material is then heated at 165° to 195° C. for at least about 15 seconds to impart maximum repellency and durability of the agent on the material.

The resulting material exhibits resistance to both water and oil and in the case of textile material such properties are retained even after many launderings and dry cleanings. Liquids other than water also serve as dispersing media.

Other methods for applying the compositions include the use of solutions in place of dispersions and stepwise deposition of polymers. Application from solution is carried out generally in the same manner as application from dispersions. Stepwise application involves deposition of the polymers separately, usually the non-fluorinated polymer being applied first. Each polymer may be applied either as a dispersion or solution by any of the means described, and the curing step may be used after both steps if desired. The cure after the second application is necessary.

The following examples illustrate the present invention and the practice thereof.

PREPARATION OF THE INTERMEDIATE THIOETHER-ALCOHOLS

EXAMPLE 1

Method (I)

a. A solution of 230 g of $R_fCH_2CH_2I$ (a mixture of about 85% $C_8F_{17}CH_2CH_2I$, 10% $C_{10}F_{21}CH_2CH_2I$ and 5% $C_8F_{17}(CH_2)_4I$) and 38 g (0.5 mole) of thiourea in 400 ml of 2-propanol was stirred at reflux for five hours on a steam bath and allowed to cool but not to crystallize. The isothiouronium salt was hydrolyzed under a nitrogen atmosphere by addition of a solution of 25 g of sodium hydroxide in 200 ml of water over 0.25 hr. After stirring at reflux for 2.5 hr., the liquid was chilled, acidified to pH 6 with 10 percent hydrochloric acid, and extracted with 1,1,2-trichlorotrifluoroethane. The extract was washed, dried over anhydrous magnesium sulfate and evaporated at reduced pressure to remove the solvent. The residue was distilled through an 8 cm Vigreux column. The main fraction was collected at 86°-94 C. (12 mm), 128.7 g, $n_D^{25}$ 1.3300. Gas phase chromatography of the distillate indicated that it consisted of 86.3 percent of $C_8F_{17}CH_2CH_2SH$, 9.1 percent of $C_{10}F_{21}CH_2CH_2SH$, and 2.5% $C_8F_{17}(CH_2)_4SH$.

b. To a solution of 2.5 g (0.105 mole) of sodium in 100 ml of absolute ethanol under nitrogen, 48 g (0.1 mole) of mercaptan prepared above was added over a period of 15 minutes. Then 10.5 g (0.105 mole) of 2-chloroethanol was added and the mixture stirred at reflux for three hours. When cool, the mixture was filtered to remove sodium chloride and evaporated under reduced pressure to give 53.4 g (99 percent) of a tan solid, mp 73°-75° C. The product was distilled at reduced pressure collecting 47.1 g at 97°-99° C./0.1 mm, mp 70°-73° C. Analysis by gas phase chromatography indicated 84.9% $C_8F_{17}(CH_2)_2S(CH_2)_2OH$, 8.9% $C_{10}F_{21}(CH)_2S(CH_2)_2OH$ and 2.3% $C_8F_{17}(CH_2)_4S(CH_2BJ2OH$.

METHOD (II)

A 5-liter, three-neck flask fitted with a condenser, a mechanical stirrer and an additional funnel was charged with 83.6 g of potassium hydroxide pellets and 400 ml of 95 percent ethanol. To this solution was added a mixture of 101 g of 2-mercaptoethanol and 150 ml of 95 percent ethanol. After stirring for 15 minutes, a solution of 690 g of $R_fCH_2CH_2I$ (4.0% $C_6F_{13}CHCH_2I$, 81.8% $C_8F_{17}CH_2CH_2I$, 4.7% $C_{10}F_{21}CH_2CH_2I$, 0.3% $C_6F_{13}(CH_2)_4I$, 4.3% $C_8F_{17}(CH_2)_4I$ and 0.3% $C_{10}F_{21}(CH)_4I$) in 1,850 ml of warm 95 percent ethanol was added in a few minutes at about 45° C. The reaction temperature was maintained at 40°-50° C. for about 2 hours. The reaction was neutralized with acetic acid and distilled to removed most of the ethanol. The residue was taken up in about 1 liter of chloroform, filtered and washed with water. The chloroform solution was dried over anhydrous magnesium sulfate and stripped. Gas phase chromatographic analysis of the yellow solid showed its composition to be 4.6% $C_6F_{13}(CH_2)_2S(CH_2)_2OH$, 80.4% $C_8F_{17}(CH_2)_2S(CH_2)_2OH$, 7.0% $C_{10}F_{21}(CH_2)_2S(CH_2)OH$, 0.3% $C_6F_{13}(CH_2)_4S(CH_2)_2OH$, 5.1% $C_8F_{17}(CH_2)_4S(CH_2)_2OH$, and 0.4% $C_{10}F_{21}(CH_2)_4S(CH_2)OH$.

Example 2

Sodium ethoxide was prepared in a magnetically stirred 3-liter, three-necked flask by the addition of 10.15 g of sodium to 200 ml of absolute ethanol. The solution was allowed to cool and a mixture of 32.8 g of 2-mercaptoethanol in 40 ml of absolute ethanol was added slowly through a dropping funnel. After stirring the mixture for a few minutes, 230 g of $C_8F_{17}CH_2CH_2I$ in 750 ml of warm absolute ethanol was added. A moderate exotherm occurred. After cooling to 40° C. with a water bath, the mixture was heated at 45° C. for 4 hr. and then poured into water. Ethanol was removed on a spin evaporator and the water was extracted with ether. The ether layer was dried over anhydrous magnesium sulfate, filtered, and evaporated with a nitrogen stream. The residue was heated at 75° C. under vacuum (1 mm) to remove any remaining volatile materials. The yield of light yellow solid, mp 71°-72° C. was 183.6 g (87.5 percent). Gas phase chromatography showed it to be 99.5% $C_8F_{17}(CH_2)_2S(CH_2)_2OH$.

PREPARATION OF THIOETHER-ACRYLIC ESTERS

EXAMPLE 3

An anhydrous system was set up consisting of a 100 ml, three-necked flask, condenser, addition funnel, nitrogen atmosphere and thermometer. To the flask was added 40.0 g of a fluorinated alcohol consisting of

| | |
|---|---|
| 1.1% $C_6F_{13}(CH_2)_2S(CH_2)_2OH$ | 0.1% $C_6F_{13}(CH_2)_4S(CH_2)_2OH$ |
| 96.9% $C_8F_{17}(CH_2)_2S(CH_2)_2OH$ | 0.2% $C_8F_{17}(CH_2)_4S(CH_2)_2OH$ |
| 1.6% $C_{10}F_{21}(CH_2)_2S(CH_2)_2OH$ | 0.1% $C_{10}F_{21}(CH_2)_4S(CH_2)_2OH$ | and 20.0 g of acrylonitrile and the mixture heated to 90° C. until it became homogeneous. A solution of 8.3 g (0.079 mole) of methacrylyl chloride in 5 ml chloroform was placed in the addition funnel and added dropwise to the refluxing mixture at about 78°–80 C. A sample of the reaction mixture was evaporated to dryness from time to time and examined by infrared. If a hydroxyl band was still present, 2 ml of the acid chloride was added and heating continued for several hours. When the reaction was complete as shown by negative hydroxyl absorption, 0.1 g of tertbutylcatechol was added as an inhibitor, and the mixture was evaporated and the residue distilled. The main fraction (17.6 g) distilled at 90° C./0.05 mm. Some polymerization occurred during distillation. Analysis of the main fraction by gas phase chromatography indicated:

1.2% $C_6F_{13}(CH_2)_2$ $S(CH_2)_2OC(O)C(CH_3) = CH_2$
94.7% $C_8F_{17}(CH_2)_2$ $S(CH_2)_2OC(O)C(CH_3) = CH_2$
1.1% $C_{10}F_{21}(CH_2)_2$ $S(CH_2)_2OC(O)C(CH_3) = CH_2$
0.2% $C_6F_{13}(CH_2)_4$ $S(CH_2)_2OC(O)C(CH_3) = CH_2$
0.8% $C_8F_{17}(CH_2)_4$ $S(CH_2)_2OC(O)C(CH_3) = CH_2$
0.4% $C_{10}F_{21}(CH_2)_4$ $S(CH_2)_2OC(O)C(CH_3) = CH_2$

EXAMPLE 4

A mixture of 52.4 g of $R_f(CH_2)_2S(CH_2)_2OH$ (Example 1), 24 g of methyl methacrylate, 0.14 g of 2,5-dimethyl-p-benzoquinone, 0.4 g of dibutyltin oxide and 25 ml of toluene was placed on a spinning band column and heated. Over a period of 4 hours, 5.3 ml of a methanol-toluene azeotrope (bp 64° C.) was collected. Additional catalyst (0.2 g) was added and the reaction continued for several hours until a total of 6 ml of azeotrope had been collected at 64°–67° C. After filtering and stripping, the crude monomer was dissolved in methylene chloride and washed with sodium bicarbonate solution. After drying, the methylene chloride solution was evaporated to give 50.8 g of crude methacrylate which was purified by molecular distillation at 73°–78° C. and 0.01 mm. Analysis by gas chromatography indicated its composition to be 5.2% $C_6F_{13}(CH_2)_2S(CH_2)_2OC(O)C(CH_3) = CH_2$, 82.3% $C_8F_{17}(CH_2)_2S(CH_2)_2-OC(O)C(CH_3) = CH_2$, 5.5% $C_{10}F_{21}(CH)_2S(CH_2)_2OC(O)C(CH_3) = CH_2$, 0.4% $C_6F_{13}(CH)_4S(CH_2)_2OC(O)C(CH_3) = CH_2$, 4.8% $C_8F_{17}(CH)_4S(CH_2)_2OC(O)C-(CH_3) = CH_2$, and 0.3% $C_{10}F_{21}(CH_2)_4S(CH_2)_2OC(O)C(CH_3) = CH_2$.

EXAMPLE 5

To a stirred solution of 7.5 g (0.33 mole) of sodium in 250 ml of absolute ethanol in a nitrogen atmosphere was added over a ten-minute period 144 g (0.30 mole) of $R_fCH_2CH_2SH$ (approximately 95 % $R_fCH_2CH_2SH$ 5% $R_f(CH_2)_4SH$ in which $R_f$ is about 5% $C_6F_3$ 90% $C_8F_{17}$ and 5% $C_{10}F_{21}$) in 50 ml of absolute ethanol. After fifteen minutes at 50° C. 31.5 g (0.33 mole) of 3-chloro-1-propanol was added and the mixture refluxed for 4 hours. It then was filtered and the solvent evaporated. Ethyl acetate was added to the solid residue and the solution was washed twice with water. The solution was dried over anhydrous magnesium sulfate, filtered, and evaporated to give 148.3 g of a tan solid. Analysis by gas phase chromatography indicated its composition to be 3.1%   1.3%

$C_6F_{13}(CH_2)_2S(CH_2)_3OH$   $C_6F_{13}(CH_2)_4S(CH_2)_3OH$
83.4%   4.1%
$C_8F_{17}(CH_2)_2S(CH_2)_3OH$   $C_8F_{17}(CH_2)_4S(CH_2)_3OH$
4.1%   1.7%
$C_{10}F_{21}(CH_2)_2S(CH_2)_3OH$   $C_{10}F_{21}(CH_2)_4S(CH_2)_3OH$

The above alcohol mixture was converted to its methacrylate ester by reacting 123 g with 24.3 g methacrylic acid, 200 ml toluene, 2.9 g methanesulfonic acid and 0.38 g t-butylcatechol. The mixture was refluxed for 5 hours collecting water as it was formed. The toluene was removed by evaporation at reduced pressure. Methylene chloride was added and the mixture washed with sodium bicarbonate solution and water. After drying over anhydrous magnesium sulfate the solvent was evaporated at reduced pressure to give 132.4 g of fluorinated methacrylates. The methacrylates were purified by molecular distillation.

EXAMPLE 6

Preparation of a mixture of:

$R_f(CH_2)_2S(CH_2)_3OC(O)C—(CH_3) = CH_2$ and $R_f(CH_2)_2SCH(CH_3)CH_2OC(O)C(CH_3) = CH_2$ A mixture of 24 g $R_fCH_2CH_2SH$ (approximately 95% $R_fCH_2CHSH$ and 5% $R_f(CH_2)_4SH$ in which $R_f$ is about 5% $C_6F_{13}$, 90% $C_8F_{17}$ and 5% $C_{10}F_{21}$), 3 g of allyl alcohol and 0.08 g of azobisisobutyronitrile was heated to 60° C. A rapid exotherm developed sending the temperature to 84° C. at which point heating was discontinued. Infrared analysis showed the reaction was complete after one-half hour. There was obtained, 25.7 g, of a solid melting at 65°–66°C.; analysis by gas phase chromatography and nuclear magnetic resonance indicated the major products were 84% $C_8F_{17}(CH_2)_2S(CH_2BJ3OH$ and 11% $C_8F_{17}(CH_2)_2SCH(CH_3)CH_2OH$.

The alcohols were converted to the methacrylate esters with methacrylyl chloride as in Example 3.

POLYMER PREPARATION

Emulsion polymers were prepared using the recipe:

| 100 parts *monomer (inhibitor free) | 45 parts acetone |
| 135 parts dionized water | 5 parts octadecyltrimethylammonium bromide |
| 0.5 part potassium persulfate | |
| *all parts are by weight | |

The ingredients were placed in a clean bottle and purged with nitrogen. The bottle was sealed, placed in a constant temperature bath, and tumbled overnight at 50° C. A latex with little coagulated polymer was obtained. Polymer solids usually ranged from about 32 to 35 percent by weight of the latex.

The monomer charged was varied according to the latex desired. For fluorinated homopolymers, the monomer charge consisted of $R_f(Y)S(Z)OC(O)C(R) = CH_2$ only. For fluorinated copolymers, the charge consisted of $R_f(Y)S(Z)OC(O)C(R) = CH_2$ and varying amounts of one or more non-fluorinated monomers which serve as a diluent (e.g. alkyl acrylates and methacrylates) or a cross-linking agent (e.g. N-methylolacrylamide, hydroxyalkyl acrylates and methacrylates, etc.).

Latices of homopolymers and copolymers of non-fluorinated monomers were also prepared by the recipe except in some cases where it was necessary to alter the water to acetone ratio to improve the yield. These emulsion polymers were used to blend with fluorinated polymers to prepare stain repellent compositions.

UTILITY OF THE POLYMER COMPOSITIONS

The polymer compositions of the invention were evaluated for their oil and water repellent properties using the following test procedures:

WATER REPELLENCY

Resistance to wetting (spray test) AATCC American Association of Textile Chemists and Colorists) - standard test method 22—1952.

This test is applicable to any textile fabric. It measures the resistance of fabrics to wetting by a water spray and the results depend primarily on the degree of hydrophobicity inherent in the fibers and yarns and subsequent treatments to which the fabric is subjected. Water is sprayed against the taut surface of a test specimen. Evaluation of the wetted pattern is readily brought about by comparing the wetted pattern with standard wetting pattern pictures:

| Rating | Characterized by |
|---|---|
| 100 | No sticking or wetting of the upper surface. |
| 90 | Slight random sticking or wetting of the upper surface. |
| 80 | Wetting of the upper surface at spraypoints. |
| 70 | Partial wetting of the whole of the upper surface. |
| 50 | Complete wetting of the whole of the upper surface. |
| 0 | Complete wetting of the whole of the upper and lower surfaces. |

The test specimens of minimum size of 7 × 7 inches (seven inches by seven inches) are conditioned at 70° F. and 65 percent relative humidity for a minimum of 4 hours before testing.

The test specimen, fastened securely and wrinkle-free in a metal hoop having a diameter of 6 inches, is placed and centered 6 inches under a standard spray nozzle at an angle of 45° to the horizontal. Two hundred and fifty milliliters of water at 80°–82° F. is poured into a funnel attached above the spray nozzle. The spray lasts 25 to 30 seconds at the end of which time the hoop is taken by one edge and the opposite edge tapped smartly once against a solid object with the wet side facing the solid; this procedure is repeated with the hoop reversed 180°.

OIL REPELLENCY

In the AATCC 118—1966T oil repellency test, drops of standard test liquids, consisting of a selected series of hydrocarbons with varying surface tensions, are placed on the fabric surface and observed for wetting. The Oil Repellency Rating is the highest-numbered test liquid which does not wet the fabric surface. The test is performed by carefully placing a small drop of the lowest-numbered test liquid on the candidate specimen in several locations. The drop is observed for 30 seconds from an angle of about 45°. If no penetration or wetting of the fabric at the liquid-fabric interface and no wicking around the drop occurs, place a drop of the next higher-numbered test liquid at an adjacent site on the fabric and again observe for 30 seconds. The procedure is continued until one of the test liquids shows obvious wetting of the fabric under or around the drop within 30 seconds.

The Standard Test Liquids and their rating are given in the table below:

TABLE I

Standard Test Liquids

| AATCC Oil Repellency Rating Number | |
|---|---|
| 1 | "Nujol"[1] |
| 2 | 65:35 "Nujol"; n-hexadecane by volume at 70° F. (21° C.) |
| 3 | n-hexadecane |
| 4 | n-tetradecane |
| 5 | n-dodecane |
| 6 | n-decane |
| 7 | n-octane |
| 8 | n-heptane |

[1]"Nujol" is the trademark of Plough, Inc., for a mineral oil meeting the following specifications: Saybolt viscosity 360/390 at 100° F(38° C.); specific gravity .880/.900 at 60° F. (15° C.). Nujol is available in most drug stores. All other hydrocarbon liquids should be laboratory quality obtainable through most chemical supply houses. One source is Matheson, Coleman and Bell, East Rutherford, New Jersey. That concern's catalogue designations are as follows:

| Solvent | Catalog Number | Specified Melting Point or Boiling Point Range |
|---|---|---|
| n-hexadecane | HX 205 | 17° to 18° C. |
| n-tetradecane | TX 220 | 4° to 6° C. |
| n-dodecane | DX 2420 | −10.5° to −9.0° C. |
| n-decane | DX 30 | 173° to 175° C. |
| n-octane | OX 60 | 124° to 126° C. |
| n-heptane | HX 80 | 98° to 99° C. |

EXAMPLE 7

Mixed Polymers From $C_8F_{17}(CH_2)_2S(CH_2)_2OC(O)C—(CH_3) = CH_2$ and Lauryl Methacrylate An emulsion polymer of $C_8F_{17}(CH_2)_2S(CH_2)_2OC(O)C(CH_3)=CH_2$ was prepared by the procedure aforesaid. A latex of poly(lauryl methacrylate) was also prepared by the same procedure. The two latices were combined to form a polymer blend containing 36 percent of the fluorinated polymer and 64 percent of the non-fluorinated polymer. The latex contained 31.5 percent solids.

The latex was diluted and applied to cotton print cloth at 91 percent wet pickup. The fabric was dried at 200° F. and cured at 160°–165°C. The oil and water repellencies obtained were as follows:

| % Polymer owf[a] | AATCC oil repellency | AATCC spray rating |
|---|---|---|
| 1 | 4 | 100 |
| 1.25 | 5 | 100 |

[a]owf; on weight of fabric

EXAMPLE 8

Mixed Polymers From $R_f(CH_2)_2S(CH_2)_2OC(O)C(CH_3) = CH_2$ and Isodecyl Methacrylate An emulsion copolymer was prepared according to the procedure aforesaid using the following monomers for the monomer charge: 75 parts $R_f(CH_2)_2S(CH_2)_2OC(O)C(CH_3) = CH_2$, 25 parts isodecyl methacrylate, 0.25 part N-methylolacrylamide and 0.25 part hydroxyethyl methacrylate. The fluorinated methacrylate consisted of 96.1% $C_8F_{17}(CH_2)_2S(CH_2)_2OC(O)C(CH_3) = CH_2$ and 1.2% $C_{10}F_{21}(CH_2)_2S(CH_2)_2OC(O)C(CH_3) = CH_2$. The yield of latex was better than 95 percent.

A non-fluorinated emulsion copolymer was also prepared by the same procedure. The monomer charged was 98.5 parts of isodecyl methacrylate, 1.0 part N-methylolacrylamide and 0.5 part of ethylene dimethacrylate.

The fluorinated latices were mixed such that the resulting latex contained one part fluorinated polymer to two parts non-fluorinated polymer. The solids content of the latex was 32.7 percent by weight.

The latex mixture was applied to 100 percent cotton print cloth along with a durable-press resin (Aerotex Reactant LC, dihydroxydimethylolylethyleneurea prepared from urea, glyoxal and formaldehyde and purchased from the American Cyanamid Corp.) and a water repellent (Water Repellent 95, American Cyanamid). After padding, the fabric was dried at 190°–200° F. and cured for 2.7 minutes at 170° C. The fabric test data is summarized in the following table.

|  | AATCC Oil Repellency | AATCC Spray Rating |
|---|---|---|
| Initial | 6 | 100 |
| One laundering | 4 | 100 |
| % polymer on weight of fabric (owf) |  | 0.7% |
| % Aerotex Reactant LC of fabric (owf) |  | 9.0% |
| % Water Repellent 95 of fabric (owf) |  | 2.0% |

EXAMPLE 9

Mixed Polymers From $R_f(CH_2)_2S(CH_2)_3OC(O)C(CH_3) = CH_2$ and Isodecyl Methacrylate A polymer latex was prepared following the procedure of Example 8 except the fluorinated monomer was $R_f(CH_2)_2S(CH_2)_3OC(O)—(CH_3) = CH_2$. This monomer consisted of 0.1% $C_6F_{13}(CH_2)_2S(CH_2)_3OC(O)C(CH_3)=CH_2$, 97.2% $C_8F_{17}(CH_2)_2S(CH_2)_3OC(O)C(CH_3)=CH_2$, 1.4% $C_{10}F_{21}(CH_2)_2S(CH_2)_3OC(O)C(CH_3)=CH_2$ and 0.2% $C_8F_{17}(CH_2)_4S(CH_2)_3OC—(O)C(CH_3)=CH_2$. The latices were mixed to give a one-to-two ratio of fluorinated polymer to non-fluorinated polymer. The solids content was 32.9 percent by weight.

Cotton print cloth was treated with the latex composition as previously described. The results are presented in the table below.

|  | AATCC Oil Repellency | AATCC Spray Rating |
|---|---|---|
| Initial | 6 | 100 |
| One laundering | 4 | 100 |
| % Polymer on weight of fabric (owf) |  | 0.7% |
| % Aerotex Reactant LC of fabric (owf) |  | 13.0% |
| % Water Repellent 95 of fabric (owf) |  | 2.0% |

Water repellent 95, used as a water repellent in the examples of aforesaid is a 25 percent by weight aqueous emulsion of the condensation product of melamine, formaldehyde and a fatty acid amide.

What is claimed is:

1. A fluorinated monomer of the formula $$R_f(Y)S(Z)O\overset{O}{\overset{\|}{C}}\overset{R}{\underset{|}{C}}=CH_2$$

wherein $R_f$ is a perfluoroalkyl group of four to 16 carbon atoms, R is selected from the class consisting of hydrogen and methyl and Y and Z are each a saturated, aliphatic divalent group in which Y contains one to 11 carbon atoms and Z contains two to 11 carbon atoms.

2. A fluorinated monomer according to claim 1 wherein Y contains two to four carbon atoms and Z contains two to four carbon atoms.

3. A fluorinated monomer according to claim 2 and having the formula $$C_6F_{13}(CH_2)_2S(CH_2)_2OC(O)C(CH_3) = CH_2$$

4. A fluorinated monomer according to claim 2 and having the formula $$C_8F_{17}(CH_2)_2S(CH_2)_2OC(O)C(CH_3) = CH_2$$

5. A fluorinated monomer according to claim 2 and having the formula $$C_{10}F_{21}(CH_2)_2S(CH_2)_2OC(O)C(CH_3) = CH_2$$

6. A fluorinated monomer according to claim 2 and having the formula $$C_6F_{13}(CH_2)_4S(CH_2)_2OC(O)C(CH_3) = CH_2$$

7. A fluorinated monomer according to claim 2 and having the formula $$C_8F_{17}(CH_2)_4S(CH_2)_2OC(O)C(CH_3) = CH_2$$

8. A fluorinated monomer according to claim 2 and having the formula $$C_{10}F_{21}(CH_2)_4S(CH_2)_2OC(O)C(CH_3) = CH_2$$

9. A fluorinated monomer according to claim 2 and having the formula $$C_8F_{17}CH_2CH_2SCH(CH_3)CH_2OC(O)C(CH_3) = CH_2$$

10. A fluorinated monomer according to claim 2 and having the formula $$C_8F_{17}CH_2CH_2SCH_2CH_2CH_2OC(O)C(CH_3) = CH_2$$

* * * * *